US006882719B2

United States Patent
Lee

(10) Patent No.: US 6,882,719 B2
(45) Date of Patent: Apr. 19, 2005

(54) METHOD FOR PROVIDING OUTGOING CALL RESERVATION SERVICE IN EXCHANGE SYSTEM

(75) Inventor: Seung-Ku Lee, Suwon-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 451 days.

(21) Appl. No.: 10/202,889

(22) Filed: Jul. 26, 2002

(65) Prior Publication Data

US 2003/0053611 A1 Mar. 20, 2003

(30) Foreign Application Priority Data

Sep. 20, 2001 (KR) ........................................ 2001-58272

(51) Int. Cl.[7] ............................ H04M 3/42; H04M 1/00
(52) U.S. Cl. .................. 379/209.01; 379/156; 379/157; 379/207.06
(58) Field of Search ..................... 379/209.01, 210.01, 379/207.01, 207.02, 207.04, 207.05, 207.06, 156, 157, 165, 198

(56) References Cited

U.S. PATENT DOCUMENTS

| 5,260,986 | A | * | 11/1993 | Pershan ....................... 455/413 |
| 5,956,395 | A | * | 9/1999 | Song ...................... 379/209.01 |
| 6,035,030 | A | * | 3/2000 | Gore ...................... 379/209.01 |
| 6,035,031 | A | * | 3/2000 | Silverman .............. 379/209.01 |
| 6,169,795 | B1 | * | 1/2001 | Dunn et al. ............. 379/209.01 |
| 6,339,640 | B1 | * | 1/2002 | Chen et al. ............ 379/209.01 |

* cited by examiner

Primary Examiner—Benny Tieu
(74) Attorney, Agent, or Firm—Robert E. Bushnell, Esq.

(57) ABSTRACT

A method for carrying out an outgoing call reservation service, method comprises the steps of determining whether there is an input of the outgoing call reservation request from a calling subscriber of an exchange system, when a called party is determined to be in a busy state; concurrently re-dialing the called party over a plurality of available central office lines; detecting when one of said central office lines connects to the called party; terminating the re-dialing over the remaining plurality of available central office lines when one of the central office lines connects to the called party; and connecting the central office line that made the connection to the called party to the calling subscriber.

9 Claims, 3 Drawing Sheets

METHOD FOR PROVIDING OUTGOING CALL RESERVATION SERVICE IN EXCHANGE SYSTEM

CLAIM OF PRIORITY

This application claims priority to an application Entitled Method for Providing an Outgoing Call Reservation Service in an Exchange System filed in the Korean Industrial Property Office on Sep. 20, 2001 and assigned the Serial No. 2001-58272, the contents of which are hereby incorporated by reference.

BACKGROUND OF THE INVENTION

1. Field of the Invention

The present invention relates generally to a private branch exchange system, and in particular, to a method for providing an internal subscriber, i.e., an extension line user of the private exchange system, with an outgoing call reservation service for a specified external (central office line) subscriber when the external subscriber's line is busy, when making a telephone call over the central office (C.O.) line.

2. Description of the Related Arts

In general, a private branch exchange (hereinafter referred to as "PBX") switches an incoming call from a central office line or an extension line to a specified extension line in response to a call switching request, or vice versa. In that regard, a PBX system generally includes a PBX, subscriber terminals (i.e., extension telephones), and a control terminal. The PBX itself can have various configurations, but typically includes at least a controller, a switching circuit, a memory, and a tone generator. Conventionally, for the purpose of making a telephone call to any central office line subscribers such as other private subscribers or a telephone information service, an internal subscriber (subscriber A), i.e., an extension line user of the private branch exchange system, needs to make a seizure of a central office line (also referred to as C.O. line) using his own extension telephone, and dial up a telephone number of an intended called party (subscriber B). At this time, if the called party, i.e., the line of subscriber B, is busy, then the calling party, i.e., the subscriber A, should dial up the same telephone number again after a while or probably use a re-dialing function provided by the extension telephone or the private exchange system in order to make the intended outgoing call to subscriber B.

In the meantime, when subscriber B is busy on the phone, an automatic re-dialing function by which a re-dialing is carried out repeatedly with a specified time interval up to a predetermined number of retries of dialing may be utilized. Use of such an automatic re-dialing function would remove the needs for subscriber A to manually repeat dialing on the same telephone number until subscriber B can be reached, thereby eliminating subscriber A's inconvenience considerably when making an outgoing call via a central office line to subscriber B.

In general, a redial calling service provided with the PBX itself allows its extension subscriber to make a call reservation for a desired outgoing calling via an office line when the called party's line cannot be rung due to it being busy. Thus, after completion of the called party's busy state, the redial calling service allows the subscriber to be connected automatically to the called party by actuating the reserved outgoing calling so as to establish a speech channel between both parties concerned. Thus, the extension subscriber would be automatically called via the reserved office line to the called party without having to re-dialing the called party's phone number repeatedly, when the called party's telephone is no longer busy.

However, when the amount of outgoing calls to a specified called party is overcrowded, even the use of a re-dialing service by the subscriber often fails to make a successful connection to the called party, owing to the continuous busy state of the called party's telephone line occupied by other calling parties. This is because many other calling parties are actually trying to call the same called party while the re-dialing by the subscriber is being served, even though the called party is no longer using his/her telephone. Thus, under this situation, a connection may have been made to between the called party and one of other calling parties just after the called party hangs up upon completion of his/her conversation with another party. This situation is very annoying to the subscriber and often causes him/her a waste of time, eventually resulting in failure of calling the called party, as a worst case scenario.

As aforementioned, when the amount of outgoing callings to a specified called party is overcrowded, even the use of a redial service by the calling party gives a relatively low probability of success in establishing a call connection to the called party owing to the continuous busy state of the called party's single telephone line occupied by other calling callers. Thus, it often takes a lot of time in successfully making a desired call connection, even leading to an eventual failure in establishing the call connection.

To solve this problem, when subscriber A tries to reach subscriber B, several extension subscriber's telephones may be employed together to make the desired outgoing call connection at the same time. However, this case still not only causes the waste of more time but also the attempt to call subscriber B more complex. Further, a critical problem arises, upon call connection with subscriber B via another extension subscriber's telephone, in attempting to transfer the call to subscriber A's own telephone from the other extension subscriber's telephone, or subscriber A must use the other extension subscriber's telephone, which would be an inconvenience not only to subscriber A but also to the other extension subscriber.

SUMMARY OF THE INVENTION

It is, therefore, an object of the present invention to provide a method for carrying out an outgoing call reservation service that allows a subscriber of a private branch exchange system to connect its call more quickly to a specified external subscriber receiving a great number of incoming calls, e.g., in a line busy state almost all the time.

It is another object of the present invention to provide a method for carrying out an outgoing call reservation service with higher probability of a successful connection in calling to an office line subscriber having a great number of incoming calls.

To achieve the above and other objects, the present invention provides a method for making an outgoing call reservation in an exchange system, comprising the steps of determining whether there is an input of the outgoing call reservation request from a subscriber of the exchange system, when an outgoing call for a specified called party is requested by the subscriber; if the outgoing call reservation request is input from the subscriber, repeatedly re-dialing the same telephone number of the specified called party a predetermined number of times over a plurality of idle central office lines connected to the exchange system, until a connection to the called party is successfully established via one of the corresponding central office lines. When a central office line is connected to the called party according to the re-dialing, connecting the corresponding central office line to the calling subscriber of the exchange system to establish a speech channel.

Preferably, the connecting step further comprises terminating the re-dialing operation to the called party on the remaining central office lines and then returning those central office lines to their previous idle state.

More preferably, the re-dialing step further comprises, for each central office line, the sub steps of detecting whether a busy tone is received from the corresponding central office line, after re-dialing of the telephone number; if no busy tone is detected after a specified time duration ends and a ring back tone is detected from the central office line, making a determination that a connection to the called party has been established on the corresponding office line; if the busy tone is detected within the specified time duration, determining that the called party is remains in a busy state and then checking whether the re-dialing via the corresponding central office line has been carried out a predetermined number of times; if the re-dialing has been not yet carried out the predetermined number of times, re-dialing the same telephone number of the called party again; and if the re-dialing has been carried out the predetermined number of times, terminating the re-dialing process for the corresponding central office line and turning the operational state of that central office line into idle state.

Preferably, the re-dialing function is assigned to all the idle central office lines assigned to the exchange system.

Preferably, the re-dialing function is assigned to a subgroup of all the idle central office lines assigned to the exchange system.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
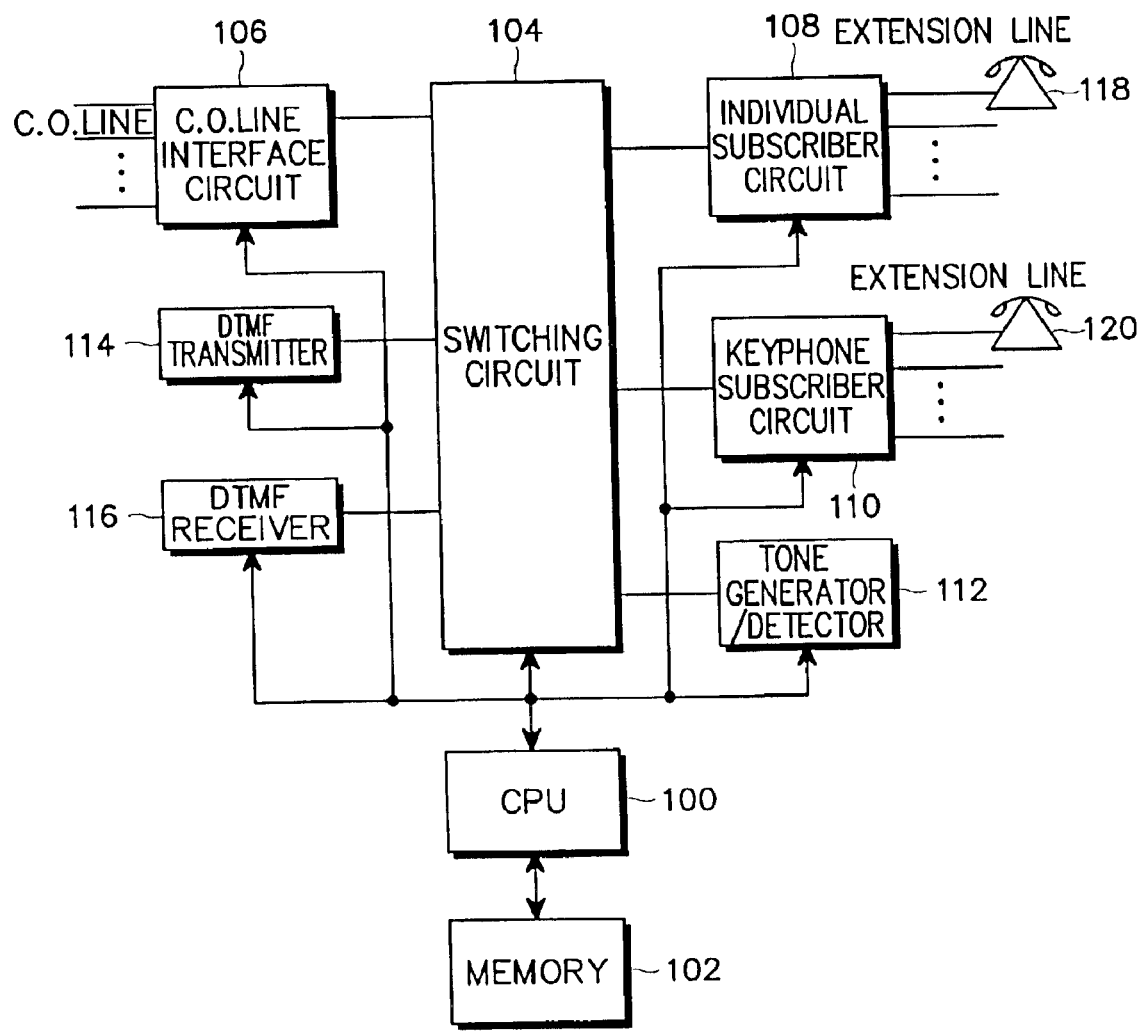
FIG. 1 is a schematic block diagram showing the electrical configuration of a private branch exchange system, e.g., a keyphone exchange system.

Referring now to FIG. 1, illustrating a block diagram for the schematic structure of a private branch exchange system, in particular, a keyphone exchange system, a central processing unit (CPU) 100 serves to generally control not only a telephone call switching operation but also all the associated operations in every circuit component of the keyphone exchange system so as to provide its user with all the necessary services. A memory 102 includes therein a ROM (Read Only Memory) and a RAM (Random Access Memory) for storing a series of operating programs and its associated initial service data for performing the call processing and all the necessary functions in the keyphone exchange and for temporarily storing the various data processed in the CPU 100. Respectively connected to a switching circuit 104 is the CPU 100, a central office line interface circuit 106, a general subscriber circuit 108, a keyphone subscriber circuit 110, a tone generator/detector 112, a dual tone multi-frequency (DTMF) transmitter 114, and a dual tone multi-frequency (DTMF) receiver 116, all of which functions to make a signal switching of the various tone and/or voice data under the control of the CPU 100.

The central office line interface circuit 106 serves to make seizure of an accessible central office line under the control of the CPU 100 in order to establish a telephone loop via the central office line and functions as an interface between the central office line and the switching circuit 104.

The general subscriber circuit 108 provides ordinary extension telephones 118 with an operating current for calling, and functions as an interface between these extension telephones and the switching circuit 104 as well. In addition, the general subscriber circuit 108 includes a ring generator (not shown) for generating a specified ring signal and serves to provide a selected ordinary extension telephone 118 with the ring signal under the control of the CPU 100.

The keyphone subscriber circuit 110 serves to communicate with other internal subscribers, using a keyphone, about the various operational data and/or call signals under the control of the CPU 100 and supply a power source to its associated internal subscriber telephones (keyphones) 120, as an interface between these internal subscriber telephones 120 and the switching circuit 104.

Internal subscriber telephones (keyphones) 120 transmit and receive data for outgoing and incoming calls via CPU 100 of the keyphone system in a different manner than the way telephones 118 perform. As such, the keyphone subscriber circuit 110 transfers the data transmitted or received between internal subscriber telephones (keyphones) 120, connects the internal subscriber telephones (keyphones) 120 to switching circuit 104 for calling, and supplies a power for operating the internal subscriber telephones (keyphones) 120 to the internal subscriber telephones (keyphones) 120. For a more detailed explanation see U.S. Pat. No. 5,544,231 to Seung-Hwan Cho, entitled "Conversion Recording/Playback Method In A Key Phone System" and incorporated by reference herein.

The tone generator/detector 112 generates various tone signals under the control of the CPU 100 and provides the generated tone signals to selected ones of the telephones 118 and 120 via the switching circuit 104 as occasions demand. Further, the tone generator/detector 112 detects the various tone signals received through the switching circuit 104 to provide the detected tone signals to the CPU 100.

The dual tone multi-frequency (DTMF) transmitter 114 generates a DTMF signal and supplies it to the switching circuit 104 under the control of the CPU 100. The DTMF receiver 116 connected to the switching circuit 104 decodes the DTMF signal produced from the telephones 118 and 120 to provide the decoded signal to the CPU 100.

According to operation of the above-described keyphone exchange system, a given internal subscriber telephone 120 seizes a central office line and the subscriber dials up an intended called party's telephone number to make an outgoing telephone call. Then, in case the subscriber of the internal subscriber telephone 120 hears a busy tone indicating that the called party's line is currently busy, the subscriber of the internal subscriber telephone 120 depresses a predetermined reservation button in his/her keyphone terminal to set up a call reservation service.

According to the present invention, the keyphone exchange system continues to redial the designated called party's telephone number repeatedly for a specified number of retry times using an idle state of a central office line or a plurality of available central office lines connected with the central office line interface circuit 106, until the keyphone exchange system is successfully connected to the called party's telephone. Therefore, such an extensive and repeated re-dialing through the plurality of idle central office lines available in the keyphone exchange system will increase the probability of success in connecting to the intended called party. Thus, a quicker connection of calling will be allowed with more ease for any designated called party having a lot of incoming calls from other callers.

The above call reservation button may be realized by means of registering any specified one of various buttons on the keyphone terminal with a conventional man-machine communication (MMC) function or a separate button dedicated for the purpose of reservation service only. Further, although the exchange system may use all the idle central office lines for the purpose of re-dialing the reserved outgoing call more quickly, it would need to leave some of the idle central office lines available to other internal subscribers.

Taking into account the above problem, the system may be preferably configured to divide the total available central office lines connectable to the central office line interface circuit 106 into plurality of sub-groups of outgoing call reservation service and then register the sub-groups into a reference table of the memory, so that upon re-dialing of any reserved outgoing call to the called party, the system utilizes only the idle central office lines available within the reservation sub-group to which the central office line of the internal subscriber who initially made the seizure of the central office line belongs.

The aforementioned division and registration to sub-groups of the central office lines for purpose of outgoing call reservation function may be realized with utilization of the MMC function, so its detailed description is omitted here. Furthermore, it would be also preferable to properly limit the number of retry times on making an outgoing call to the reserved called party.

Figure 2:
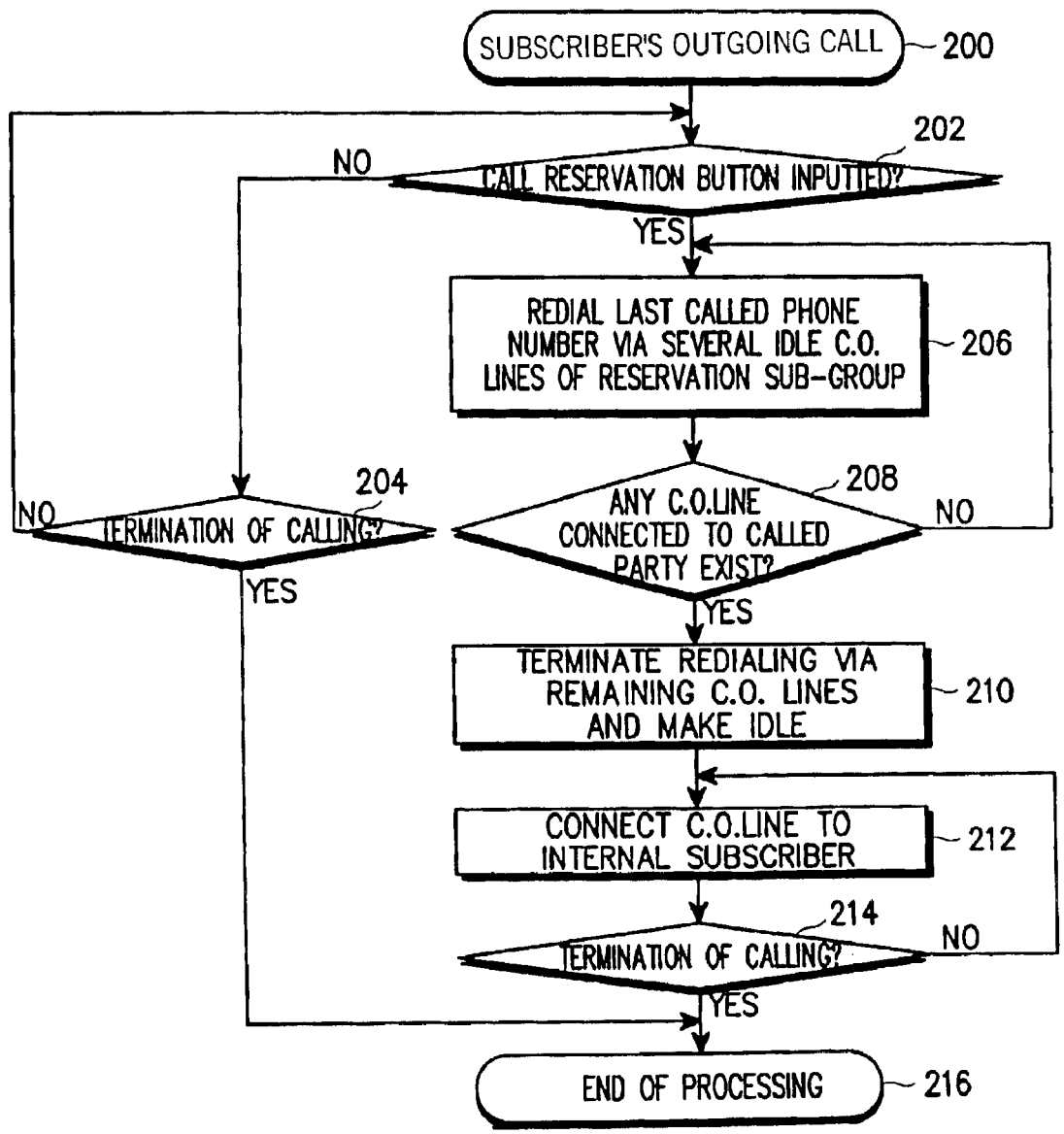
FIG. 2 is a flowchart diagram applicable for carrying out the outgoing call reservation service according to a preferred embodiment of the present invention.

FIG. 2 illustrates, by way of example, a flowchart diagram of the control procedure carried out in the CPU 100 for the outgoing call reservation service according to a preferred embodiment of the present invention.

Referring to FIG. 2, when a called party is busy when an outgoing call is made from any one of the internal subscriber telephones 120 in step 200, the CPU 100 determines in step 202 whether a call reservation button has been depressed on the calling internal subscriber telephone 120 via the keyphone subscriber circuit 110. If there is no input of the call reservation button, then the CPU 100 determines in step 204 whether or not the calling internal subscriber has terminated the call. If terminated, the CPU 100 carries out a normal call termination in step 216, while if not yet terminated, then the control goes back to the step 202.

In the meantime, when the called party is busy and it is determined in step 202 that there is an input of the call reservation button by the calling internal subscriber, then the control of the CPU 100 proceeds to step 206 in which the CPU 100 repeatedly carries out a re-dialing for an outgoing call to the called party's telephone number using several central office lines having an idle state of the call reservation sub-group corresponding to the initial central office line which the calling internal subscriber seized, and then CPU 100 determines in step 208 whether or not any one of the central office lines of the reservation sub-group is connected to the called party. If not, it is preferred that steps 206 and 208 are repeated a predetermined number of times.

Figure 3:
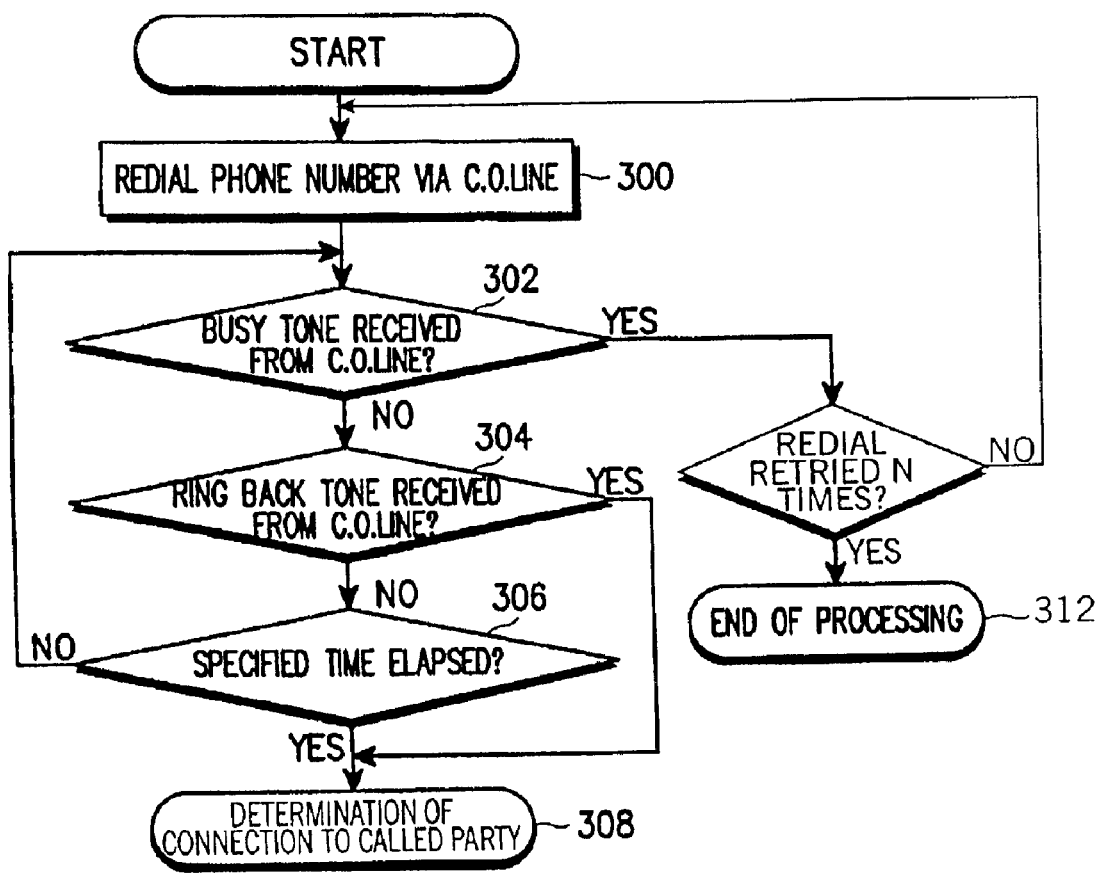
FIG. 3 is a flowchart diagram applicable to a portion of the process shown in FIG. 2 for carrying out the outgoing call connection according to the preferred embodiment of the present to invention.

FIG. 3 illustrates a flowchart diagram of the control procedure applicable for carrying out the outgoing call reservation service according to a preferred embodiment of the present invention for processing the outgoing call re-dialing operation for each respective idle available central office line of the call reservation sub-group by the CPU 100 in the step 206 of FIG. 2.

First, for each available central office line of the call reservation sub-group the CPU 100 re-dials, in step 300, the called party's telephone number, which the calling internal subscriber dialed before depressing the call reservation button, via the central office line interface circuit 106. Thereafter, in the steps 302 to 306, CPU 100 controls the switching circuit 104 to connect the tone generator/detector 112 to the available central office line and then determines whether or not a busy tone is received or a ring back tone is received during a specified time duration.

If no busy tone is detected in step 302 and the ring back tone is detected in step 304 before a lapse of the specified time duration, step 306, then it is determined in step 308 that the a connection to the called party has been established for that available central office line. If no busy tone is detected in step 302, the ring back tone is not detected in step 304 and the specified time duration, step 306, has not elapsed, then the process returns to step 302. If the specified time duration elapses before a busy tone or ring back tone is received, it is determined in step 308 that the a connection to the called party has been established (this can occur, for example, when a called party happens to pick up his/her receiver before the called party's telephone rings) over that available central office line.

If the busy tone is detected in step 302 before a lapse of the specified time duration, step 306, then CPU 100 determines that the called party is currently in a busy state, and the process goes to step 310, wherein the CPU 100 determine whether or not a re-dialing for the outgoing call has been retried a specified re-dialing number of times N. If not yet fully retried up to the specified redialing number of times N, then the control proceeds to step 300 to redial the outgoing call again, then the process returns to step 302.

If the re-dialing has been fully tried up to the specified re-dialing number of times N, then the control proceeds to step 312 to terminate the outgoing call retry and the corresponding available central office line of the call reservation sub-group is then marked as having an idle state. Therefore, re-dialing is carried out repeatedly under the control of the CPU 100 until a connection to the called party to which the internal subscriber originally dialed is accomplished or the specified number of re-dialing times is reached.

In the meantime, if there exists in step 208 a determination that one of the available central office lines of the call reservation sub-group is connected to the called party according to the above-described procedure, then the control proceeds to step 210, to terminate the outgoing call re-dialing operation on the remaining central office lines of the call reservation sub-group and these lines are all set (returned) to the idle state.

Subsequently, in steps 212 and 214, the CPU 100 controls the switching circuit 104 to connect the central office line connected to the called party with the internal subscriber who made the call reservation. At this time, the internal subscriber is provided with a ring back tone and then is allowed to hear the voice or message of the called party answering its incoming call via the central office line. The internal subscriber will usually hear only the ring back tone on the phone until the called party hooks off or replies to the incoming call, and after the hook-off, a speech path will be made between both parties. Upon termination of the calling between two parties, a known call termination procedure is carried out in step 216.

Accordingly, as apparent from the foregoing description, the concurrent and repeated outgoing re-dialing to a specified called party using several idle central office lines assigned to a sub-group of call reservation according to the present invention would allow an increase in the probability of success in call connection, thereby achieving more prompt telephone connection to the specified called party which has a lot of incoming calls from other subscribers, that is to say, a heavy user of central office lines. Further, as the call reservation method according to the present invention employs only a single extension telephone, it would be much more convenient than the use of several telephones by several internal subscribers to make the concurrent outgoing calls to an identical telephone number for the specified subscriber as well as ensure the individual security. In particular, the present invention may be helpful in making a telephonic booking for playing golf in the weekend.

Alternatively, while making a re-dialing for the outgoing call reservation service according to the invention, a message may be displayed on a liquid crystal display unit of the internal subscriber telephone or an LED on the call reservation button is turned on to notify the user of processing the reservation call service demanded. Further, in the preferred embodiment of the invention, a keyphone exchange system has been taken as an example of a private branch exchange system, but other type of exchange system provided with its extension subscribers with any type of call reservation button or key function may be used in substitution of the keyphone exchange system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for making an outgoing call reservation in an exchange system, comprising the steps of:
   (a) determining whether there is an input of the outgoing call reservation request from a subscriber of the exchange system, when a specified called party is in a busy state;
   (b) if the outgoing call reservation request is input from the subscriber, making a re-dialing to a telephone number of the specified called party repeatedly by a predetermined times of retries, concurrently using a plurality of idle central office lines assigned to a redial sub-group, until a connection to the called party is successfully established via one of the central office lines of said redial sub-group; and
   (c) if there is any central office line of the redial sub-group connected to the called party according to the re-dialing on the outgoing call, connecting the corresponding central office line to the subscriber of the exchange system to establish a speech channel.

2. The method according to claim 1, wherein the connecting step (c) further comprises terminating the re-dialing operation to the called party on the remaining central office lines of the redial sub-group and then setting these central office lines in an idle state.

3. The method according to claim 1, wherein, for each idle central office line corresponding to the redial sub-group, the re-dialing step (b) further comprises the sub steps of:
   detecting whether a busy tone is received from the corresponding central office line within a specified time duration, after re-dialing of the telephone number;
   if no busy tone is detected detecting whether a ring back tone is received from the corresponding central office line within said specified time duration;
   if no busy tone nor ring back tone is detected before the specified time duration elapses, returning to the step of detecting whether a busy tone is received;
   if no busy tone nor a ring back tone is detected and the specified time duration has elapsed, determining that a connection to the called party has been established on the corresponding office line and returning to step (c);
   if no busy tone is detected and a ring back tone is detected before the specified time duration elapses, determining that a connection to the called party has been established on the corresponding office line and returning to step (c);
   if the busy tone is detected within the specified time duration, determining that the called party is in busy state and then checking whether the re-dialing via the corresponding central office line has been carried out fully by a specified number of retry times;
   if the re-dialing has been not yet been carried out fully by the specified number of retry times, re-dialing to the telephone number of the called party and returning to the step of detecting whether a busy tone is received from the corresponding central office line; and
   if the re-dialing has been carried out fully up to the specified number of retry times, terminating the redial process for the corresponding central office line and setting this central office line in the idle state.

4. The method according to claim 2, wherein, for each idle central office line corresponding to the redial sub-group, the re-dialing step (b) further comprises the sub steps of:
   detecting whether a busy tone is received from the corresponding central office line within a specified time duration, after re-dialing of the telephone number;
   if no busy tone is detected detecting whether a ring back tone is received from the corresponding central office line within said specified time duration;
   if no busy tone nor ring back tone is detected before the specified time duration elapses, returning to the step of detecting whether a busy tone is received;
   if no busy tone nor a ring back tone is detected and the specified time duration has elapsed, determining that a connection to the called party has been established on the corresponding office line and returning to step (c);
   if no busy tone is detected and a ring back tone is detected before the specified time duration elapses, determining that a connection to the called party has been established on the corresponding office line and returning to step (c);
   if the busy tone is detected within the specified time duration, determining that the called party is in busy state and then checking whether the re-dialing via the corresponding central office line has been carried out fully by a specified number of retry times;

if the re-dialing has been not yet been carried out fully by the specified number of retry times, re-dialing to the telephone number of the called party and returning to the step of detecting whether a busy tone is received from the corresponding central office line; and if the re-dialing has been carried out fully up to the specified number of retry times, terminating the redial process for the corresponding central office line and setting this central office line in the idle state.

5. The method according to claim 1, wherein the plurality of idle central office lines of the redial sub-group are assigned from all the central office lines available to the exchange system.

6. A method for re-dialing a called party, having a busy state, from a calling subscriber of an exchange system, comprising the steps of:

detecting input of a call reservation by the calling subscriber;

concurrently re-dialing the called party over a plurality of available central office lines;

detecting when one of said central office lines connects to said called party;

terminating the re-dialing over the remaining plurality of available central office lines when one of said central office lines connects to said called party;

connecting said one of said central office lines to said calling subscriber.

7. The method as set forth in claim 6, for each of said plurality of available central office lines, said step of concurrently re-dialing the called party over a plurality of available central office lines comprises the steps of:

determining whether or not a busy tone is received over said central office line within a predetermined time period;

determining whether or not a ring back tone is received over said central office line within said predetermined time period, when it is determined that said busy tone is not received over said central office line within said predetermined time period; and making a determination that said central office line is connected to said called party when it is determined that said ring back tone is received over said central office line within said predetermined time period.

8. The method as set forth in claim 7, for each of said plurality of available central office lines, said step of concurrently re-dialing the called party over a plurality of available central office lines further comprises the steps of:

determining whether or not said predetermined time period has elapsed when it is determined that neither said busy tone nor said ring back tone are received over said central office line within said predetermined time period;

returning to said step of determining whether or not a busy tone is received over said central office line, when it is determined that predetermined time period has not elapsed; and making a determination that said central office line is connected to said called party, when it is determined that predetermined time period has elapsed.

9. The method as set forth in claim 8, for each of said plurality of available central office lines, said step of concurrently re-dialing the called party over a plurality of available central office lines further comprises the steps of:

determining whether or not the re-dialing of the called party has been retried a predetermined number of times, when it is determined that said busy tone is received within said predetermined time period;

re-dialing the called party again, when it is determined that the re-dialing of the called party has not been retried a predetermined number of times, and returning to said step of determining whether or not a busy tone is received over said central office line; and ending the re-dialing of the called party over said central office line, when it is determined that the re-dialing of the called party has been retried a predetermined number of times, and setting said central office line in an idle state.

* * * * *